2 Sheets, Sheet 1.

J. Leffel,

Double Turbine Water Wheel.

No. 3,171. Reissued Oct. 27, 1868.

Witnesses,
Thos. L. Bugle
Chas. F. Clausen

Inventor.
James Leffel
John W. Beckwith
Exrs of Jas. Leffel dec'd
by
O. S. Holloway
their Atty.

2 Sheets. Sheet 2.
J. Leffel,
Double Turbine Water Wheel.
No. 3,171. Fig. 3. Reissued Oct. 27, 1868.
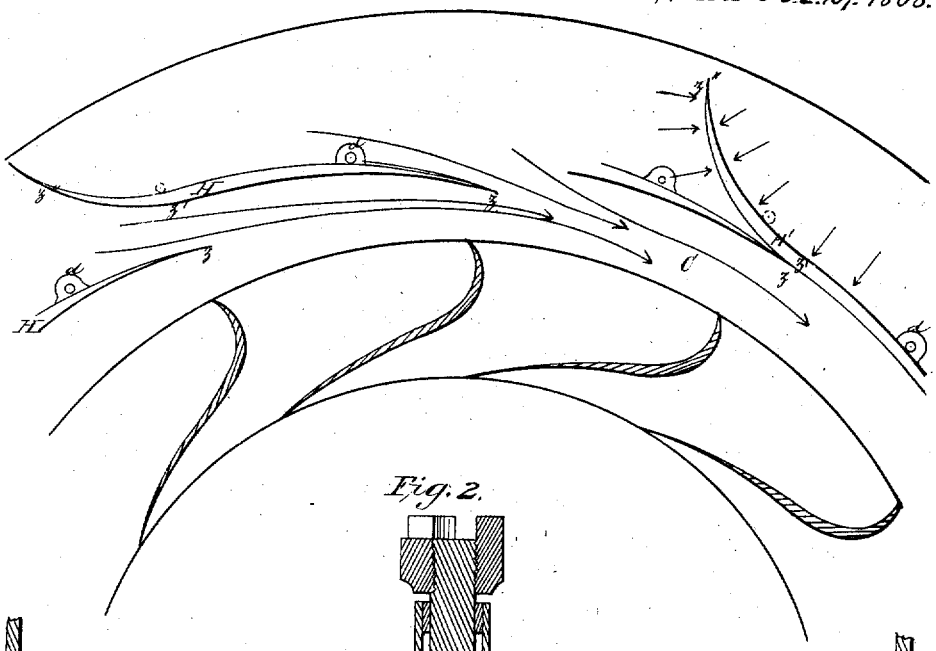
Fig. 2.
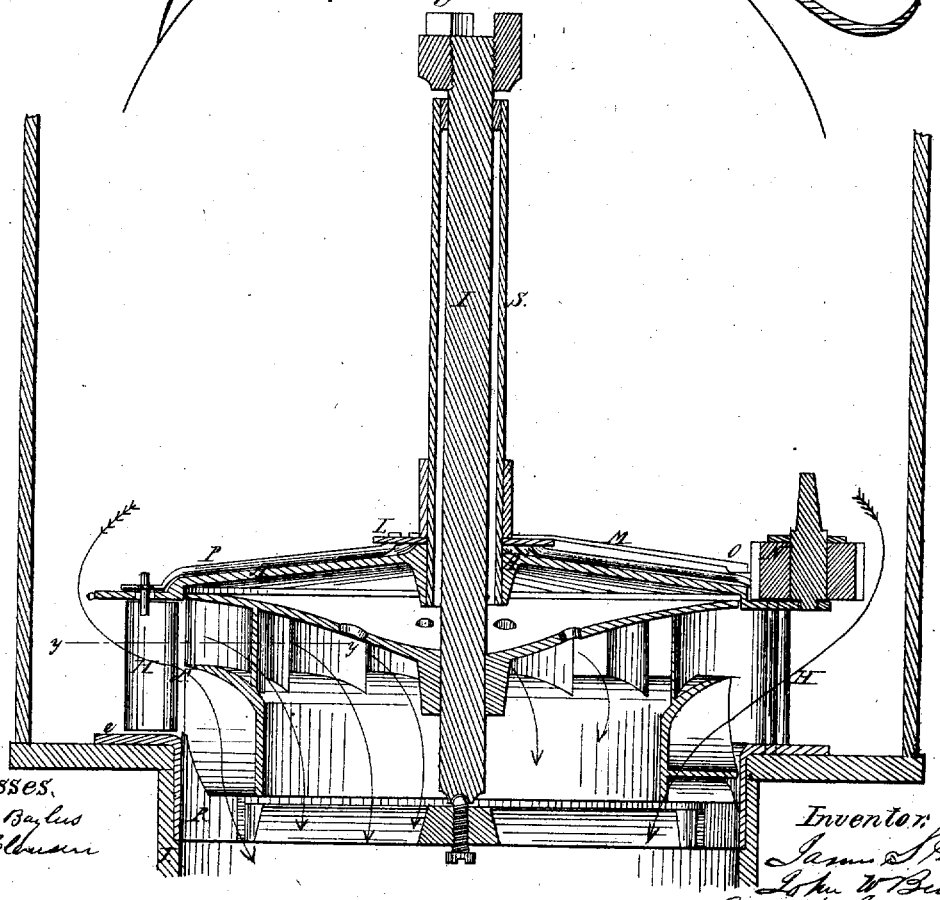
Witnesses.
Thos L. Bayles
Chas F. Clausen
Inventor:
James Leffel
by his Attorneys
Geo. W. Burkwalter
& Jas. Leffel, Jr.
Dayton, Ohio.
N. PETERS, PHOTO-LITHOGRAPHER, WASHINGTON, D. C.

UNITED STATES PATENT OFFICE.

JAMES S. GOODE AND JOHN W. BOOKWALTER, OF SPRINGFIELD, OHIO, EXECUTORS OF THE ESTATE OF JAMES LEFFEL, DECEASED.

IMPROVEMENT IN GATES FOR WATER-WHEELS.

Specification forming part of Letters Patent No. 34,150, dated January 14, 1862; Reissue No. 1,792, dated October 11,1864; Reissue No. 3,171, dated October 27, 1868.

DIVISION B.

*To all whom it may concern:*

Be it known that JAMES LEFFEL, of Springfield, in the county of Clarke and State of Ohio, has invented a new and useful Improvement in the Gates of Water-Wheels; and we do hereby declare that the following is a full, clear, and exact description of the same, reference being had to the annexed drawings, making part of this specification, in which—

Figure 1:
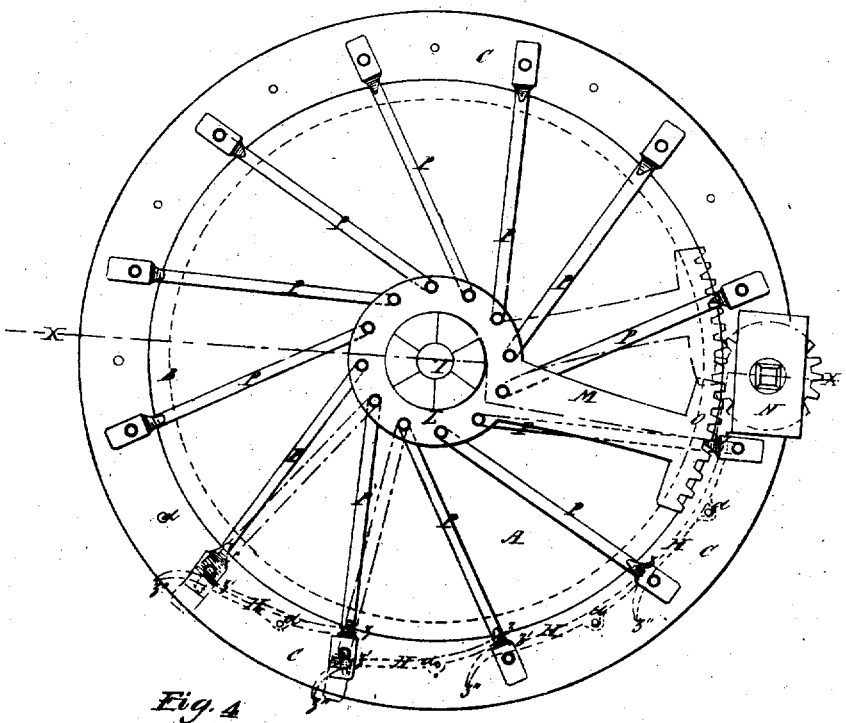
Figure 4:
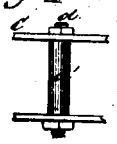

Figure 1 is a top or plan view. Fig. 2 is a vertical section taken on the line *x x*, Fig. 1. Fig. 3 is a horizontal section of a portion of the casing and wheel, taken on the line *y y* of Fig. 2. Fig. 4 is an elevation, showing the flanges and connecting-bolt.

The same letters are employed in all the figures in the designation of the same parts.

This invention relates to the gates of that class of turbine water-wheels in which the water is received at all points of the circumference of the wheel, being delivered thereto horizontally, and thence discharged vertically, or in a direction perpendicular to that in which it is received; and it consists in combining, with an upper and lower flange, a series of intermediately-placed oscillating gates, which perform the double function of gates to control the amount and guides to determine the direction of the water flowing through the wheel, said gates being of the peculiar construction and arrangement to be hereinafter set forth.

In the case illustrated in the drawings the gates are shown as applied to the casing and wheel of LEFFEL'S double turbine.

H are the gates, which are placed between the parallel horizontal flanges *c* and *e*, respectively attached to the crown-plate A and cylinder R.

For a fuller description of the construction of these parts reference is made to the specification filed in another subdivision of this application. It being therein fully explained, it is not necessary herein to repeat such details.

The wheel being covered by the crown-plate and inclosed below by the cylinder R, the water can only flow into the wheel through the space between the flanges *c* and *e*, in which space the vertical plates H are arranged in series entirely around the wheel, so as to admit the water equally to all parts thereof at the same time.

The gates are formed by thin metallic plates, the shape of which is clearly shown in Fig. 3. They are attached, by bolts passing through the flange *c* and *e* into lugs at *d*, upon their upper and lower edges, or by short journals cast with the plates and passing into holes formed in said flanges, or in any other convenient manner.

The gates in Fig. 3, on the left side, are represented as open. The two on the right are represented as closed. The issue of the wheel is formed at *z z'*. The inner end of the gate is at *z*, the outer end at *z''*. The point *z* is on the inner face of the gate, (or face nearest the wheel,) at the point where the curve formed in the outer end of the plate begins to be reversed to form the curve of the inner end of said plate.

The curves of the plates between *z'* and *z* are determined by the circumference of a circle concentric with the wheel, and having a radius slightly greater than that of the wheel.

When the gates are closed their inner faces will form a perfect circle around the wheel, the point of one plate, *z*, folding against the next plate in the series at *z'*, so as to exclude the water, and when the gates are open there will be a space between the points of the gates and the periphery of the wheel sufficient to permit the reunion of the column of water broken in passing through the gates.

The consequence of this construction and arrangement of the oscillating gates is, that when open the water flowing through the gates will be delivered upon the wheel in a line precisely tangential to the circumference thereof, and not, as is the case in other wheels, on a line forming a secant of said wheel. By this means the water is delivered on the wheel invariably in a direction to produce the maximum of effect.

The direction of the line of impact is to be determined by the line of the center of the column of water passing between the gates, and not by that part of the column passing along the surface of the gate-plates.

Outside of the termination of the inner curve, at *z'*, the plate is curved in the opposite direction, so that, as seen in the drawings, the throat of the gate outside is formed between two converging curved lines, and the issue is at the point where the curves are reversed, at $z'$. The advantage of this peculiar form is, that the curved lines, conforming to the curves of what hydraulicians call the *vena contracta*, the largest possible amount of water will be delivered through an orifice of a given area, and in consequence the water will be delivered upon the wheel with a minimum of disturbance, and therefore without wasting any of its force.

The gates are pivoted at $d$, which point is determined by the middle of that part of the gate between $z$ and $z'$, so that when the gate is closed the inward pressure of the water is the same upon the portion of the gate between $z$ and $d$, and that between $z'$ and $d$. There being thus an equilibrium of pressure upon the two ends of the gates, it follows that they may be opened and closed by the application of power sufficient merely to overcome the friction of the parts.

The gates are operated simultaneously in opening and closing. One way of effecting this—by means of the rod D, collar L, arm M, rack-bar O, and pinion N—is shown in the drawings, and described in another subdivision already referred to.

What we claim as the invention of the said JAMES LEFFEL, and desire to secure by Letters Patent, is—

1. The gates H, when constructed substantially as described, so arranged around the wheel as to form converging throats, and so pivoted that when closed there shall be an equilibrium of pressure on the opposite ends thereof, substantially as set forth.

2. Gates H, which have their faces from $z''$ to $z'$ outwardly flaring, and their faces from $z'$ to $z$, when closed, on a curve concentric with the wheel, and pivoted to the flanges $c$ and $e$ at a point, $d$, in the middle of the latter faces, substantially as set forth.

In testimony whereof we have signed our names to this specification before two subscribing witnesses.

JAMES S. GOODE.
JOHN W. BOOKWALTER.

Witnesses:
R. MASON,
T. C. CONNOLLY.